(12) United States Patent
Marusic

(10) Patent No.: US 7,025,812 B2
(45) Date of Patent: Apr. 11, 2006

(54) PORTABLE AIR CLEANING APPARATUS

(76) Inventor: Cedo Marusic, 975 Aberdeen Ave. NE., Renton, WA (US) 98056

( * ) Notice: Subject to any disclaimer, the term of this patent is extended or adjusted under 35 U.S.C. 154(b) by 80 days.

(21) Appl. No.: 10/878,554

(22) Filed: Jun. 29, 2004

(65) Prior Publication Data
US 2005/0284300 A1 Dec. 29, 2005

(51) Int. Cl.
*B01D 47/06* (2006.01)
(52) U.S. Cl. .............................. 96/240; 96/271; 96/371
(58) Field of Classification Search .................. 96/240, 96/247–250, 271, 300, 333, 337, 371; 95/196, 95/198, 205, 214; 261/115
See application file for complete search history.

(56) References Cited

U.S. PATENT DOCUMENTS

| | | | | |
|---|---|---|---|---|
| 3,596,439 A | * | 8/1971 | Moragne | ...................... 96/233 |
| 3,628,311 A | * | 12/1971 | Costarella et al. | ............ 96/228 |
| 3,744,217 A | | 7/1973 | Ebert | |
| 3,907,525 A | | 9/1975 | King | |
| 4,153,435 A | * | 5/1979 | Fischer | ......................... 96/248 |
| 4,749,389 A | * | 6/1988 | Worwag | ........................ 96/365 |
| 4,818,259 A | * | 4/1989 | Marano | ........................ 96/234 |
| 5,123,936 A | | 6/1992 | Stone et al. | |
| 5,378,265 A | * | 1/1995 | Pearl | ........................... 95/219 |
| 5,509,946 A | * | 4/1996 | Chu | ............................ 96/140 |
| 2003/0056648 A1 | | 3/2003 | Fornai et al. | |

* cited by examiner

*Primary Examiner*—Frank M. Lawrence
(74) *Attorney, Agent, or Firm*—Richard C. Litman

(57) ABSTRACT

The portable air cleaning apparatus includes a body casing that has a base having a generally vertical sidewall and removable top wall. A fluid spray chamber has a recirculation system that supplies a fluid to at least one spray nozzle through which the fluid is sprayed into the fluid spray chamber. An air driving mechanism directs ambient air into an air inlet through the fluid spray chamber and discharges at least partially purified air out a plurality of air outlets. At least one inlet filter is positioned between the air inlet and a reservoir inside the spray chamber to create a counter-current contact between the air and the fluid to maximize the removal of particulates from the air. At least one outlet filter is positioned below the air outlets to further remove particulate matter from the air flow being discharged through the air outlets.

19 Claims, 4 Drawing Sheets

PORTABLE AIR CLEANING APPARATUS

BACKGROUND OF THE INVENTION

1. Field of the Invention

The present invention relates to a portable air cleaning apparatus for purifying ambient air in homes, offices, and other buildings. Specifically, the present invention relates to a freestanding electrically powered air cleaning apparatus that removes at least some impurities, such as dust, pollen, and other particulate matter, from a confined space.

2. Description of the Related Art

Concerns about indoor air quality are growing among consumers and in the business community. People are increasingly aware that indoor air pollution can be responsible both for short-term health effects, such as eye irritation, headache, respiratory problems, and allergies, and also for serious long-term diseases, such as chronic respiratory syndromes.

There are air cleaning devices on the market; however, most of them are non-portable, bulky, inefficient for purifying ambient air in confined spaces, and are permanently attached to existing air conditioning or heating systems. Other air cleaning devices are designed for industrial installation, which is not suitable for domestic use or independent operation as a domestic appliance in a single room environment. Still other domestic air cleaning devices lack the capacity to sufficiently cleanse the air. Therefore, there is a continuing need for a portable, lightweight air cleaning apparatus that is freestanding, provides efficient air dispersion and filter management, and improves noise control.

U.S. Patent Publication No. 2003/0056648, published Mar. 27, 2003, describes an air cleaning apparatus that has an inlet for ambient air to enter the apparatus and an outlet for purified air to exit the apparatus. A packed column scrubber generates, via the distributor, a spray of scrubbing liquor from the top of the scrubber. Ambient air enters from the lower part of the scrubber where a counter-current contact between the air and the scrubbing liquor is created in order to remove impurities dissolved or dispersed in the ambient air. The lower part of the scrubber is filled with a media of fillers or porous elements. A pump circulates the scrubbing liquor from a feeding tank through the scrubber. A blower draws the ambient into the apparatus and discharges the purified air out of the apparatus. The apparatus is distinguishable for requiring the use of a packed scrubber.

U.S. Pat. No. 3,744,217, issued Jul. 10, 1973 to Ebert, shows an electrostatic air filter that has a duct with an inlet opening at one end and an outlet opening at the other end. An electrode is suspended by an insulator in the duct, and a liquid flows along the inside walls of the duct downward to a reservoir. As the air is drawn past the electrode, the particles and impurities suspended therein are ionized, oxidized, and driven into the liquid flow, then washed into the reservoir. The electrostatic air filter is distinguishable for using the combination of ionization, high voltages, oxidation through ozone, and immediate separation in a steady flow of water film.

U.S. Pat. No. 3,907,525, issued on Sep. 23, 1975 to King, discloses an apparatus for cleaning ventilating systems of grease, vapors, orders, and smoke. The apparatus has a housing with an inlet passage located at the lower end and an outlet passage located at the upper end. The upper end is connected to a conventional roof-top fan and the lower end is adapted to an existing roof-top exit. The apparatus combines a water-cooled centrifugal extractor formed by a trough and baffle skirt with continuous water washing from spray nozzles, and an electrostatic precipitator component to remove small particles in the air stream. The apparatus is distinguishable for being used in a commercial environment to remove grease, odors and smoke from a ventilation system.

U.S. Pat. No. 5,123,936, issued Jan. 23, 1992 to Stone et al., describes a process and apparatus for removing fine particulate matter and vapors from a process exhaust air stream. The apparatus includes a transfer duct in which an exhaust air stream passes through. A water spray is introduced into the duct where the exhaust air enters and then the exhaust air stream passes through a filter chamber where a plurality of filters separate the water from the exhaust air stream. The solid particulate matter and vapors are absorbed in the water droplets and the exhaust air is cooled before exiting the other end of the duct. The apparatus is distinguishable for its particular type and arrangement of the filters to remove the water-entrained particulate matter and vapors from the exhaust air stream.

None of the above inventions and patents, taken either singly or in combination, is seen to describe the instant invention as claimed. Thus a portable air cleaning apparatus solving the aforementioned problems is desired.

SUMMARY OF THE INVENTION

The portable air cleaning apparatus of the present invention is a freestanding electrically powered air cleaning apparatus that removes contaminants from ambient air. The present air cleaning apparatus generally comprises a body casing that has a base wall having a generally vertical sidewall and a removable top wall. The body casing defines an internal space therein. The apparatus comprises a fluid spray chamber disposed inside the body casing, at least one air inlet, a plurality of air outlets, and an air driving mechanism that directs ambient air through the air inlet into the fluid-spray chamber and then discharges at least partially purified air out through the plurality of air outlets.

The fluid spray chamber includes a recirculation system that supplies a fluid, e.g., water, to at least one spray nozzle through which the fluid is sprayed into the fluid spray chamber. The fluid becomes separated into a plurality of fine droplets upon exiting the at least one nozzle. The fluid droplets intermix with the air passing through the fluid chamber. This intimate contact between the air and the fluid causes air-borne impurities, such as dust and particulate matter, to be retained in the fluid.

An inlet filter is located below the air inlet in the fluid spray chamber, creating a counter-current contact between the fluid and the air. This intimate contact between the air and the fluid causes air-borne impurities, particularly dust and particulate matter, to be retained in the fluid. As the fine fluid droplets pass through the inlet filter the impurities are trapped in the filter. An outlet filter is positioned immediately before the plurality of air outlets to remove impurities and particulate matter from the discharging air.

Accordingly, it is a principal object of the invention to provide a portable air cleaning apparatus for purifying the air by removing fine particulate matter, such as pollen, dust, and other particulates circulating through homes, offices and other buildings.

It is another object of the invention to provide a portable air cleaning apparatus that can be easily moved from one room to another and positioned near a window or a door.

It is a further object of the invention to provide a portable air cleaning apparatus that is a self-contained, freestanding, electrically-powered air cleaning apparatus that can be connected to an external power source, such as an electrical outlet.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
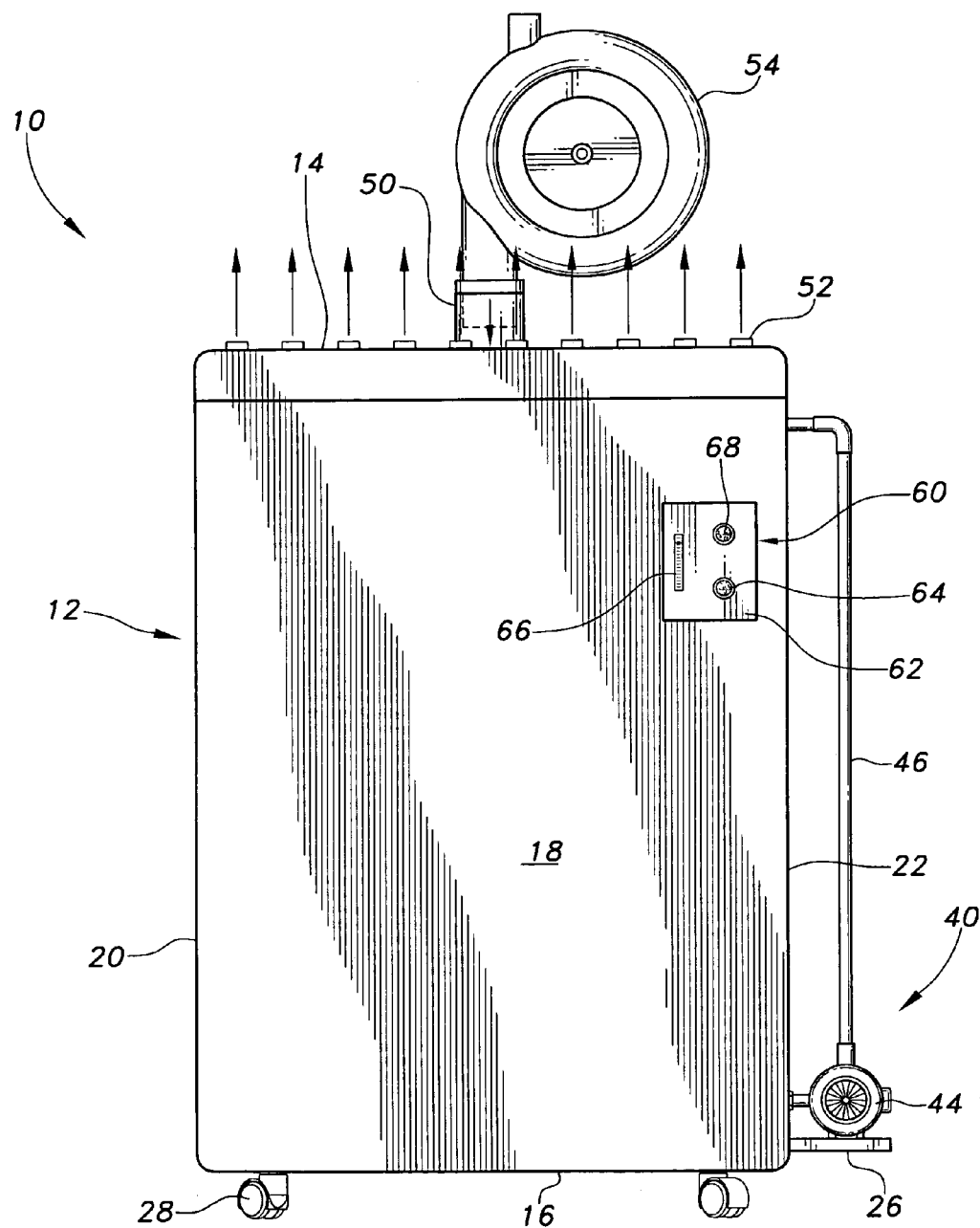
FIG. 1 is an elevational view of a portable air cleaning apparatus according to the present invention.

The present invention is directed to a portable air cleaning apparatus, designated generally as 10 in the drawings. The air cleaning apparatus filters fine particulate matter, such as pollen, dust, and other particulates circulating through homes, offices and other buildings from ambient air.

Figure 2:
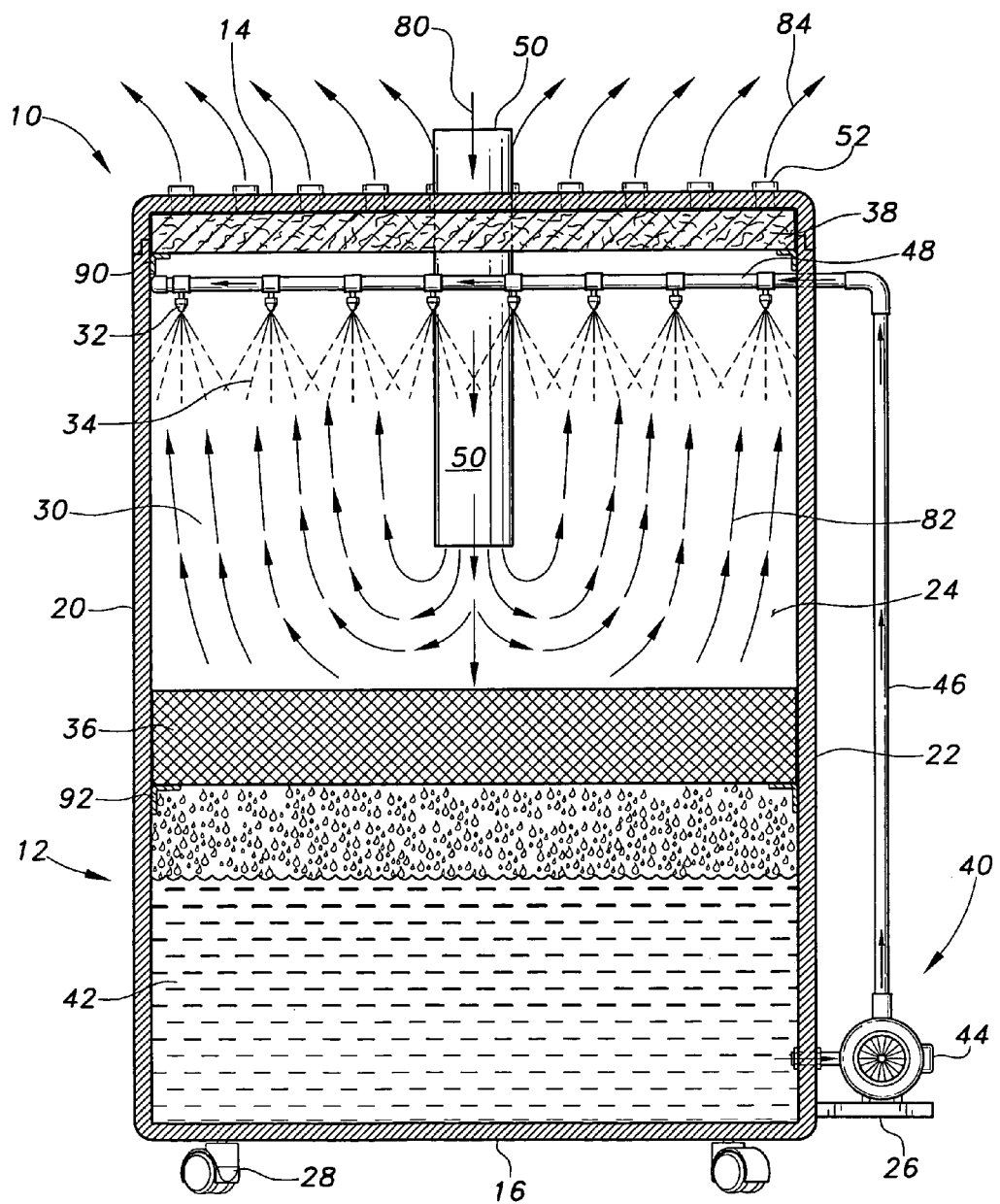
FIG. 2 is a front view in section of a portable air cleaning apparatus according to the present invention.

As shown in FIGS. 1 and 2, the air cleaning apparatus comprises a housing or body casing 12. The body casing 12 has a removable top wall 14 for gaining access therein, a bottom or base wall 16, a front wall 18, a rear wall 24, and two opposing sidewalls, 20 and 22.

The portable air cleaning apparatus comprises an air inlet 50, a plurality of air outlets 52, and a fluid spray chamber 30 disposed within the body casing 12. An air driving mechanism 54, such as a blower or fan (not shown in FIG. 2) is connected to the air inlet 50 and draws and/or blows ambient air 80 into the fluid spray chamber 30.

The air driving mechanism 54 introduces ambient air 80 from the surrounding room through the air inlet 50 and then discharges at least partially purified air 84 through the air outlets 52 formed in the removable top wall 14. The air inlet 50, preferably is mounted to the removable top wall 14 and partially extends into the fluid spray chamber 30. The air driving mechanism 54 can be a blower, a fan, impeller, or similar mechanism.

As shown in FIG. 2, the fluid spray chamber 30 comprises a plurality of spray nozzles 32 connected to a recirculation system 40. The recirculation system 40 has a fluid drive mechanism 44 mounted to a support member 26 to draw fluid from a sump or reservoir 42 located in the lower portion of the fluid spray chamber 30 through a conduit 46 and then into a manifold 48. The manifold 48 delivers the fluid to the spray nozzles 32, which are connected to the manifold 48 in a configuration to optimize the contact between the ambient air 80 and fluid spray 34. The fluid drive mechanism can be a fluid pump or other suitable apparatus to recirculate the fluid under pressure.

In the fluid spray chamber 30, the manifold 48 extends horizontally through the sidewall 22 and the spray nozzles 32 are located at the upper portion of the fluid spray chamber 30. The ambient air 80 is directed through the air inlet 50 into the fluid spray chamber 30, where the air mixes and interacts with a plurality of fine droplets of fluid 34 introduced through the spray nozzles 32. Preferably, the spray nozzles 32 are arranged to maximize the contact between the fluid and the passing air in the upper portion of the fluid spray chamber 30 to remove the particulate matter from the air.

At least one replaceable inlet filter 36 is disposed inside the fluid spray chamber 30. The inlet filter 36 is securely attached to at least one bracket 92 mounted to the body casing 12. The inlet filter 36 is positioned between the reservoir 42 and the ambient air entering through the air inlet 50 to create a counter-current contact between the air flow 82 and the fluid droplets 34.

The counter-current is created to optimize contact between the air and the fluid droplets, which causes airborne impurities to be retained in the fluid. The inlet filter 36 then removes any trapped airborne particulate matter from the fluid droplets before the fluid returns to the reservoir 42 and is recirculated to the spray nozzles 32.

Figure 3:
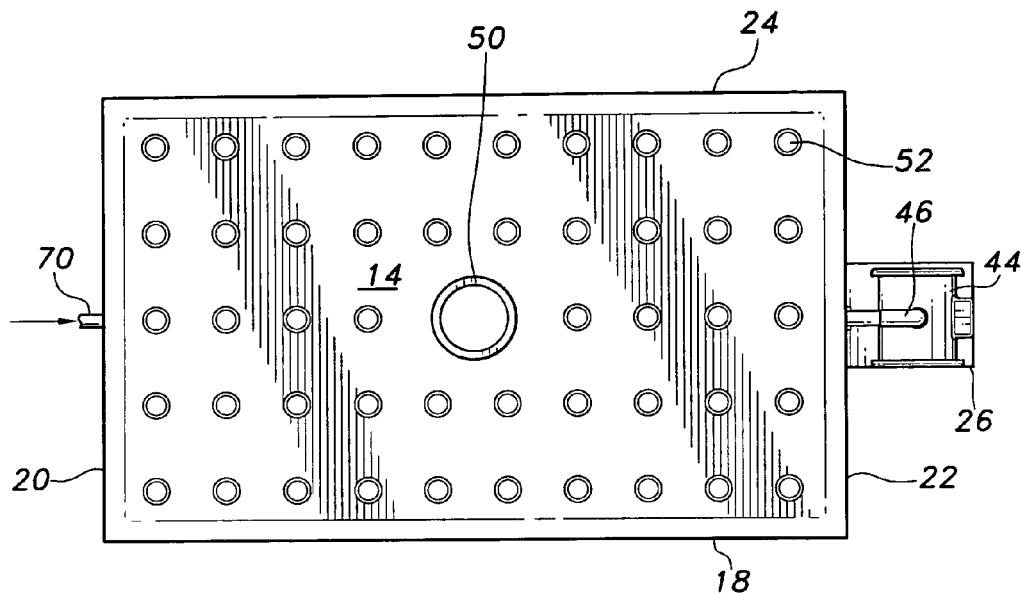
FIG. 3 is a top view of a portable air cleaning apparatus according to the present invention.
Figure 4:
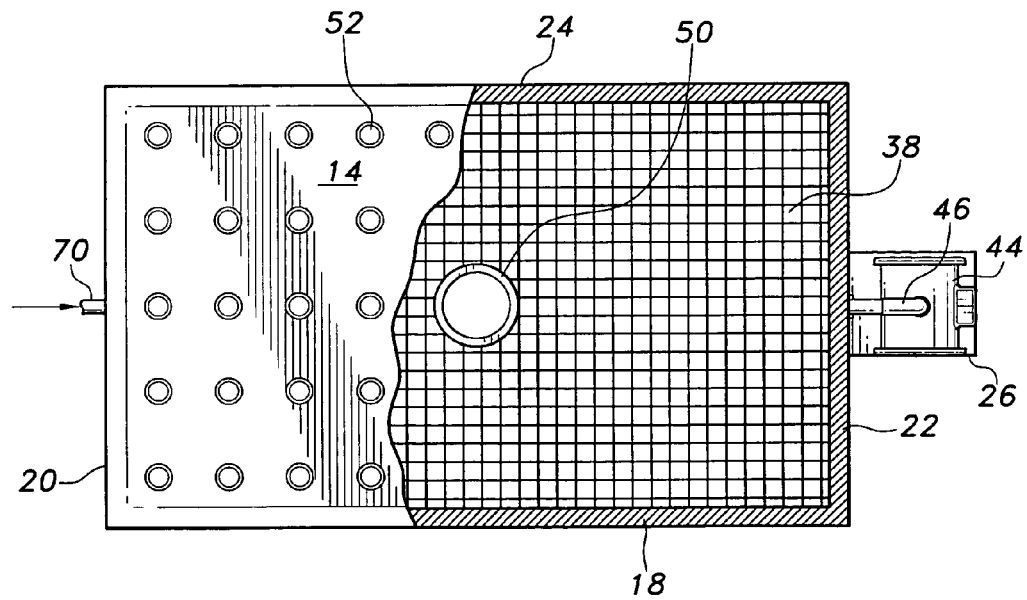
FIG. 4 is a top view of the apparatus of FIG. 3 with the housing broken away and partially in section.

Referring to FIGS. 2–4, at least one replaceable outlet filter 38 is disposed inside the spray chamber 30 and positioned immediately before the plurality of air outlets 52. The outlet filter 38 is securely attached to at least one bracket 90 mounted to the body casing 12.

The outlet filter 38 is designed to further extract particulate matter from the ambient air before being discharged through the air outlets 52. The inlet and outlet filters, 36 and 38 respectively, can be easily replaced by removing the top wall 14 of the body casing 12 to gain access therein.

As shown in FIGS. 2–4, the air outlets 52 are attached to the removable top wall 14. The air outlets 52 have an opening that may be flush with or extend away from the exterior surface of the removable top wall 14. The air outlets 52 are symmetrically arranged and sized to promote efficient material exchange between the fluid droplets 34 and the air flow 82 that occurs within the fluid spray chamber 30. The air outlets may be of a generally rectangular, oval or cylindrical shape.

Figure 5:
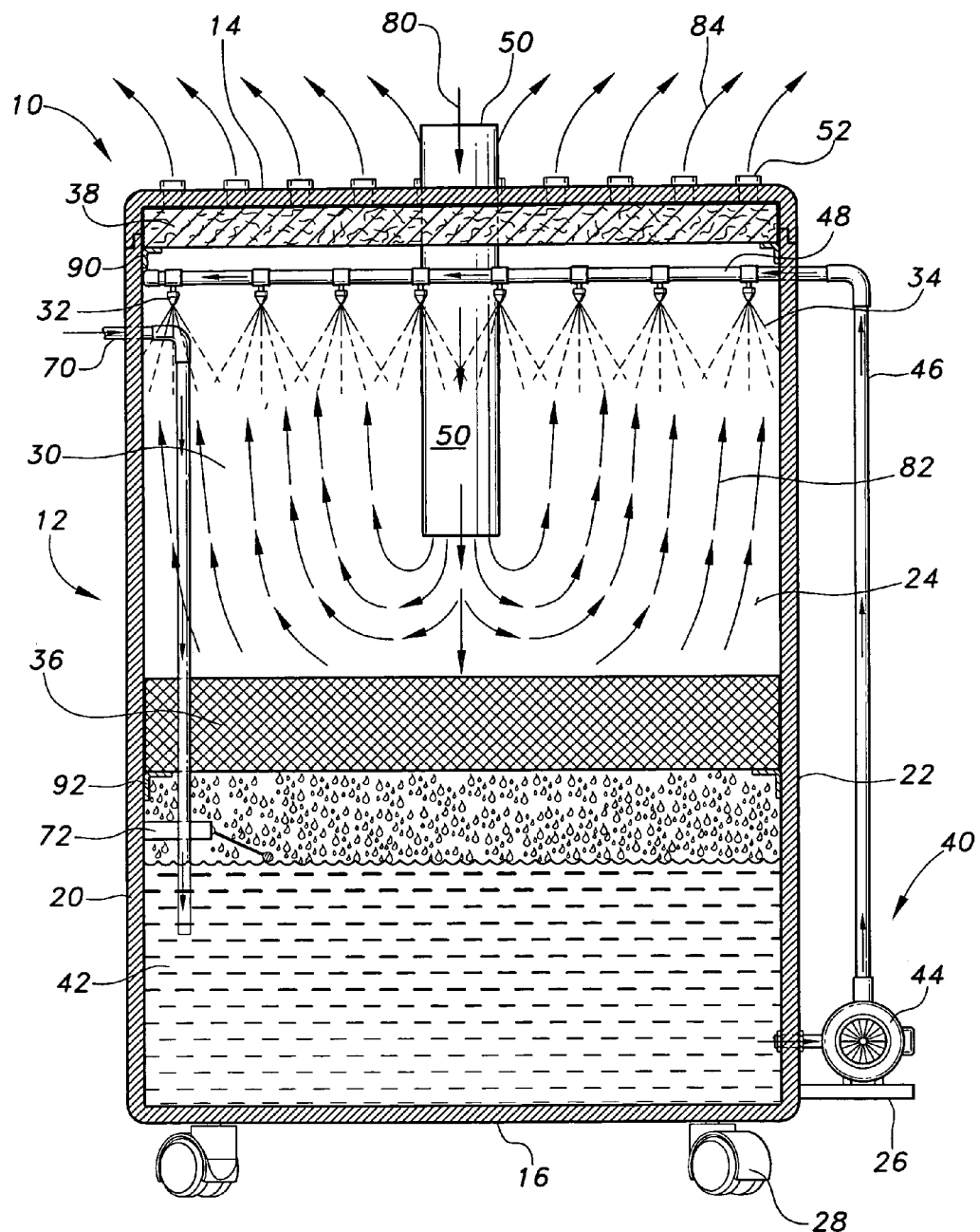
FIG. 5 is a sectional view of the portable air cleaning apparatus similar to FIG. 2, illustrating an alternative embodiment with a fluid supply pipe attached to a valve.

As shown in FIG. 5, the portable air cleaning apparatus 10 may include a fluid supply pipe 70 disposed in the upper portion of the fluid spray chamber 30. The supply pipe 70 is connected to a valve 72 disposed in the reservoir 42. The valve 72 is used to regulate and control the fluid level in the reservoir 42.

The valve 72 may be in the form of a gate valve, a float valve, a ball-cock valve, or similar device for use. When the fluid level decreases in the recirculation system, the air cleaning apparatus 10 can be easily moved to a convenient location where a supplementary supply device (not shown) can be connected to the supply pipe to replenish the fluid level in the reservoir.

Referring again to FIG. 1, the portable air cleaning apparatus 10 comprises a control panel 60 located on the front wall 18 and approximately adjacent to the sidewall 22. The control panel 60 provides a means for controlling the operation of different devices, such as the air fan 54 and/or the fluid pump 44, of the portable air cleaning apparatus 10. The control panel 60 has a display board 62 where the consumer may have the choice of changing the air flow rate by a switch 64, or to activate/deactivate different devices of the portable air cleaning apparatus 10, such as a fluid pump 44. The display panel 60 includes an on/off switch 68. The display board 62 has an indicator 66 for communicating information to the consumer.

Some examples of information that can be communicated to the consumer are: the fluid level in the reservoir 42; the fluid pressure; the air flow rate; or when the inlet and/or outlet filters 36 and 38 need to be replaced. Additionally, the display panel 62 can be fitted with automatic sensors, such as humidity, temperature, and dust sensors, that will switch the portable air cleaning apparatus 10 on/off or adjust the air blower 54 (or fan) or the fluid pump 44 operations when it is most appropriate.

In operation, the portable air cleaning apparatus 10 may be supplied with power that is activated through the control panel 60. Once activated, the air driving mechanism 54 forces the surrounding air in the room to enter the fluid spray chamber 30 through the air inlet 50. The inlet filter 36 is positioned below the air inlet 50, which creates a counter current contact between the passing air and the spraying fluid from the spray nozzles 32. The fluid drive mechanism 44 delivers the fluid from the reservoir 42 into the spray nozzles 32.

The spray nozzles 32 introduce the fluid into the spray chamber 30 where the air mixes and interacts with the spraying fluid. As the spraying fluid collides with the dust, pollen, or harmful gases in the air, the fluid droplets remove these impurities and other particulate matter as the fluid passes through the inlet filter 36 and returns to the reservoir 42. The outlet filter 38 traps the remaining particulate matter in the air as the air exits the fluid chamber 30 through the air outlets 52.

The replaceable inlet filter 36 may be polyester, polypropylene, or any type of particulate filter that is designed to eliminate particles contained in the ambient air, for example particles above 10–100 micron or more. Preferably, the inlet filter 36 filters particulate matter between 20–80 microns. More preferably, the inlet filter 36 is a 50-micron polyester filter. The thickness of the inlet filter 36 will vary depending on the type of filter used. However, a thickness of approximately ½ to 3 inches is preferred.

The replaceable outlet filter 38 may be a mechanical filter of wool, cotton or other suitable filters, such as a fiberglass filter, electrostatic filter and non-woven filter, for example of HEPA or ULPA type, for removing particulate matter. The outlet filter 38 may have a thickness of 1/16 to 3 inches, depending upon the type of filter used. Preferably, the outlet filter 38 is located immediately before the air outlets 52 to eliminate the smaller solid particles and/or liquid droplets, such as below 80 microns, or even submicron particles, contained in the purified air, for example, particles below 0.3 micron.

As illustrated in FIG. 1, the portable air cleaning apparatus 10 may also include a plurality of wheels 28 removably attached to the base wall 16. The air cleaning apparatus 10 can be moved into a position that is preferably close to or near a window or a door.

As shown in FIG. 2, the removable top wall 14 has an upper lip that engages and interlocks with a lower lip of at least one sidewall 20 or 22, the rear wall 24, and/or the front wall 18. Preferably, the removable top wall 14 engages and interlocks with the body casing 12 to form a tight seal.

The portable air cleaning apparatus 10 is preferably an independent, stand-alone device that can be connected to an electrical wall outlet. Preferably, the air cleaning apparatus 10 is portable. However, the portable air cleaning apparatus 10 may be a stand-alone device that is affixed to a wall, or some other surface, so that it is not portable.

It is preferred that the fluid used in the device be recirculated. Although a variety of fluids may be used in the portable air cleaning apparatus 10, a simple fluid, such as water, may be more desirable for domestic uses. This is because at least some of the fluid will evaporate into the room with the air passing through the portable air cleaning apparatus 10. The use of water will have the advantageous effect of adding humidity to the indoor air, which will reduce the problem of dry air caused by forced air heating and air conditioning systems. Moreover, additional additives could be provided in the water to provide disinfectants, aromatic qualities, or to provide specific attraction of particular air impurities.

The body casing 12 of the portable air cleaning apparatus 10 may be made of any appropriate material that is suitable, such as plastic or metal. The body casing 12 may be a generally rectangular or cylindrical shape. Moreover, the body casing 12 may be a tank.

The air cleaning apparatus 10 may also comprise a means for adding air enhancers, for example fragrance or perfumes, to the partially purified air.

The air cleaning apparatus 10 may also be operationally connected to a fluid supply system for supplying a scrubbing liquor. The scrubbing liquor could contain aqueous or essentially non-aqueous solution solvent and further additives to promote mass transfer between the air and the fluid interface.

It is to be understood that the present invention is not limited to the embodiments described above, but encompasses any and all embodiments within the scope of the following claims.

I claim:

1. A portable air cleaning apparatus, comprising:
   a body casing a bottom wall, at least one sidewall extending from and about the bottom wall, and a removable top wall extending over the sidewall, the body casing defining a hollow interior having an upper portion defining a fluid spray chamber and a lower portion defining a liquid reservoir;
   at least one air inlet extending through the body casing for admitting ambient air into the hollow interior;
   a plurality of air outlets extending through the body casing for exhausting purified air from the hollow interior;
   means for drawing ambient air through the air inlet into the fluid spray chamber and for discharging cleansed air through the air outlets;
   at least one spray nozzle disposed inside the fluid spray chamber adapted for spraying a liquid fluid into the fluid spray chamber as a plurality of fine droplets;
   at least one replaceable inlet filter located below the air inlet for creating a counter-current contact between the liquid fluid and the air and for removing a portion of air-borne impurities retained in the liquid fluid; and
   at least one replaceable outlet filter disposed immediately before the air outlets for removing impurities and particulate matter from the cleansed air.

2. The portable air cleaning apparatus according to claim 1, further comprising means for recirculating a liquid fluid between said reservoir and said at least one spray nozzle.

3. The portable air cleaning apparatus according to claim 1, further comprising:
   a fluid pump connected to said reservoir;
   a conduit extending from said pump;
   a manifold extending from said conduit into said fluid spray chamber, said at least one nozzle being attached to said manifold;

whereby a liquid fluid is pumped from said reservoir through the conduit and manifold, discharged through said nozzle and falls into said reservoir in order to recirculate a liquid fluid through said body casing.

4. The portable air cleaning apparatus according to claim 1, wherein said air inlet is mounted to said removable top wall and extends into the spray chamber.

5. The portable air cleaning apparatus according to claim 1, wherein said inlet filter is a mechanical filter of wool or cotton.

6. The portable air cleaning apparatus according to claim 1, wherein the inlet filter is a polyester filter.

7. The portable air cleaning apparatus according to claim 6, wherein the inlet filter is a 50 micron filter.

8. The portable air cleaning apparatus according to claim 1, wherein said means for drawing comprises a blower.

9. The portable air cleaning apparatus according to claim 1, further comprising a control panel means for controlling the operation of the air cleaning apparatus.

10. The portable air cleaning apparatus according to claim 9, wherein said control panel means comprises a display panel having an indicator for communicating information to a consumer.

11. The portable air cleaning apparatus according to claim 1, wherein the removable top wall engages and interlocks with said at least one sidewall, forming a tight seal.

12. A portable air cleaning apparatus, comprising:
a tank defining a fluid spray chamber;
a removable top wall attached to the tank for gaining access therein;
an air inlet attached to the removable top wall for admitting ambient air into the tank;
a plurality of air outlets attached to and extending away from the removable top wall for exhausting purified air from the tank;
a plurality of spray nozzles disposed in the fluid spray chamber for spraying a liquid into the chamber; and
an inlet filter disposed inside the fluid spray chamber for creating a counter-current contact between the fluid and air passing through the tank and for removal of impurities dissolved or dispersed in ambient air by contact with the liquid spray.

13. The portable air cleaning apparatus according to claim 12, further comprising a blower attached to said air inlet for drawing ambient air into the apparatus and discharging at least partially purified air from the apparatus.

14. The portable air cleaning apparatus according to claim 12, further comprising an outlet filter disposed inside the apparatus for removing particulate matter.

15. The portable air cleaning apparatus according to claim 14, wherein the outlet filter is a 50-micron mechanical filter located before the air outlets.

16. The portable air cleaning apparatus according to claim 12, further comprising a plurality of wheels attached to the tank.

17. A portable air cleaning apparatus, comprising:
a body casing having a base wall, a front wall, a rear wall, two opposing sidewalls, and a removable top wall, the body casing defining a hollow interior;
at least one air inlet mounted to the removable top wall;
a plurality of air outlets mounted to the removable top;
a fluid spray chamber disposed within the body casing, the fluid spray chamber having a recirculation system in communication with a plurality of spray nozzles;
an air driving mechanism in communication with the air inlet for drawing ambient air into the fluid spray chamber and discharging at least partially purified air out the air outlets;
at least one replaceable inlet filter located below the air inlet for creating a counter-current contact between the fluid and the air and for removing a portion of air-borne impurities retained in the fluid;
at least one replaceable outlet filter disposed immediately before the air outlets for removing impurities and particulate mater from the discharging air;
a supply pipe disposed in the fluid spray chamber for connecting to a supplementary supply device; and
a valve connected to the supply pipe for maintaining a fluid level in a reservoir.

18. The portable air cleaning apparatus according to claim 17, wherein the inlet filter is a polyester filter.

19. The portable air cleaning apparatus according to claim 17, wherein the outlet filter is a mechanical filter.

* * * * *